United States Patent [19]

Airhart

[11] Patent Number: 4,848,512

[45] Date of Patent: Jul. 18, 1989

[54] VIBRATORY SEISMIC SOURCE

[75] Inventor: Tom P. Airhart, Plano, Tex.

[73] Assignee: Atlantic Richfield Company, Los Angeles, Calif.

[21] Appl. No.: 269,403

[22] Filed: Nov. 10, 1988

[51] Int. Cl.[4] .............................................. G01V 1/02
[52] U.S. Cl. .................................... 181/114; 181/121; 367/189
[58] Field of Search ...................... 181/114, 121, 119; 367/75, 189, 190

[56] References Cited

U.S. PATENT DOCUMENTS

| 4,660,674 | 4/1987 | Airhart | 181/114 |
| 4,662,473 | 5/1987 | Betz | 181/114 |
| 4,719,607 | 1/1988 | Airhart | 367/189 |

Primary Examiner—Deborah L. Kyle
Assistant Examiner—J. Woodrow Eldred
Attorney, Agent, or Firm—Roy L. Van Winkle

[57] ABSTRACT

The improved seismic vibration apparatus includes variable length control means located so as to effectively and efficiently position the vibrator relative to the base plate and apparatus to isolate the vibrator from the control system and from the vehicle frame so that effective seismic vibration is imparted into the base plate and consequently into the earth.

11 Claims, 3 Drawing Sheets

VIBRATORY SEISMIC SOURCE

TECHNICAL FIELD OF THE INVENTION

This invention relates generally to apparatus for imparting seismic vibratory signals to the earth. More particularly, but not by way of limitation, this invention relates to improved apparatus for imparting seismic vibratory signals to the earth along a selected vector path.

BACKGROUND OF THE INVENTION

Recent advances in the ability of seismic data acquisition and processing equipment to handle large amounts of data have stimulated greater interest in the development of versatile high energy seismic sources adapted to produce both compressional and shear waves. One goal in the development of "multi-component" seismic sources is to enable the operator to more efficiently measure sub-surface formation properties such as porosity, fracture orientation, pore fluid type, or lithologic type. It is known that P, SH and SV waves travel with their own distinct velocities when passing through a particular geologic formation. Thus, changes in formation property, such as rock type, porosity and the like, may be detectable by changes in the full wave field (i.e., the P, SV and SH wave velocities). A strong correlation observed between lateral variations in the compressional to shear wave velocity ratio (Vp/Vs) with known changes in the geologic formation suggests that these variations may be used to infer changes in the lithology, porosity, or pore fluid content of the sub-surface formation. By recording the full waveform of a seismic wave, including P, SH and SV waves, one can get far more detailed information concerning rock properties at depths than would otherwise be possible.

There are two major types of surface seismic sources currently available which have been adapted to the production of combined P and S waves. One is the impulsive-type source wherein a heavy mass is propelled in a single downward stroke to impact a ground engaging target. The other is the reciprocating vibratory-type transducer which imparts a controlled, varying frequency signal into the earth, as exemplified by the Vibroseis ® reciprocation vibrator seismic source (a registered trademark of Conoco, Inc.). It is with the latter type of seismic source that the invention to be described is particularly concerned.

The general concept of simultaneously imparting both compressional and shear wave vibrational energy to the earth with seismic exploration apparatus is taught in U.S. Pat. No. 4,321,981 issued to K. H. Waters on Mar. 30, 1982, entitled "Combination Shear Wave and Compressional Wave Seismic Energy Vibrator". In accordance with the above referenced patent, a combination of two or more vibrating masses may be operated along opposing non-vertical vibrational axes, oriented at a fixed angle to each other in parallel planes. The times of passage of the masses through a common central point as they vibrate along their respective axes can be controlled to establish a phase relation between the two vibratory motions. By varying the related phrases of the two masses, one can effect desired inputs of compressional and shear waves simultaneously.

The referenced Waters patent teaches that the parallel planes in which the respective vibration axes of the two masses lie are to be oriented either transversely to the line of seismic survey, i.e., the line between the location of the seismic source and the recording geophones, or also such survey line. With proper phasing, the above-referenced transverse axial orientation of the vibrating masses enables one to produce and record simultaneously P waves and shear SH waves. On the other hand, if the vibrational axes are aligned with the survey line, one can generate and record simultaneously P waves and shear SV waves. The vertical component of motion in both cases produces so called "converted" shear SV waves and shear SH waves but such waves cannot be processed and interpreted with conventional seismic methods. Thus, Waters teaches in effect that only by operating the patented apparatus successively in these two modes can one generate and record at a single remote location all forms of a seismic wave, including P, SH and SV waves, in a manner which permits conventional processing.

In the field of seismic exploration today, data aquisition and processing equipment has been developed to handle large amounts of data that is generated by apparatus constructed to produce both compressional and shear waves.

Patents illustrating full wave field vibratory seismic sources include U.S. Pat. No. 4,662,473, issued May 5, 1987, to Robert M. Betz; U.S. Pat. No. 4,655,314 issued Apr. 7, 1987, to Tom P. Airhart; U.S. Pat. No. 4,660,675, issued Apr. 28, 1987, to Tom P. Airhart; and U.S. Pat. No. 4,719,607 issued Jan. 12, 1988 to Tom P. Airhart. Each of these patents illustrate apparatus capable of producing vibratory seismic waves at varying inclinations and azimuths without repositioning the ground engaging base plate of the apparatus or without repositioning the vehicle utilized for carrying such apparatus.

U.S. Pat. No. 4,719,607 illustrates a general design for a multi-component vibratory seismic apparatus. This invention described hereinafter is an improvement to that apparatus.

When conducting the seismic exploration of an area of interest, it is generally necessary that the vibratory seismic source be moved to a large number of locations. Accordingly, such apparatus is usually mounted on vehicles. Such vehicles must include means for raising and lowering the ground engaging base plate and the vibratory source. These vehicles also usually include means for powering the vibratory source. An example of a vehicle mounted seismic source is illustrated in U.S. Pat. No. 4.660.674 issued Apr. 28, 1987, to Tom P. Airhart. It will be noted in that patent that the seismic source is not a vibratory seismic source, but rather utilizes a heavy mass that is propelled downwardly against the surface of the base plate to produce an instantaneous heavy shock wave thereto. Despite the differences in the type of seismic source illustrated, the patent does illustrate the mounting of a source on a vehicle such as is contemplated by this invention.

From the listed patents, it can be seen that a number of attempts have been made to control the inclination and azimuth of the vibratory source relative to the base plate. While the foregoing systems work satisfactorily, it would be highly desirable to more precisely, and in a shock isolated arrangement, control the inclination and the azimuth of the seismic source. Accordingly, an object of this invention is to provide improved inclinable seismic vibratory apparatus that is shock isolated for imparting seismic vibratory signals to the earth at precise inclinations and azimuths.

SUMMARY OF THE INVENTION

This invention provides improved seismic apparatus for imparting vibratory signals into the earth along selected vector paths. The apparatus is suitable for mounting on a vehicle frame and comprises a ground engaging base plate, shock isolated lift means connectable with the frame and connected with the base plate whereby the base plate can be moved from a transport position out of engagement with the ground to an operating position engaging the ground, and vibratory means for producing the vibratory signals. The vibratory means having an axial centerline and being mounted on the base plate whereby the axial centerline can be positioned within preselected angles and a preselected azimuths. Control means is provided for positioning the axial centerline of the vibratory means at desired inclinations and azimuths. The control means includes first and second variable length means disposed at substantially right angles to the axial centerline when the axial centerline of vibratory means is at a generally right angle to the base plate, means for selectively and independently changing the length of each variable length means, and generating means for transmitting a signal to cause the variable length means to change length to position the vibratory means at a selected inclination and azimuth.

BRIEF DESCRIPTION OF THE DRAWING

The foregoing and additional objects and advantages of the invention will become more apparent when the following detailed description is read in conjunction with the accompanying drawing wherein like reference characters denote like parts in all views and wherein.

DETAILED DESCRIPTION OF THE PREFERRED EMBODIMENT

Figure 1:
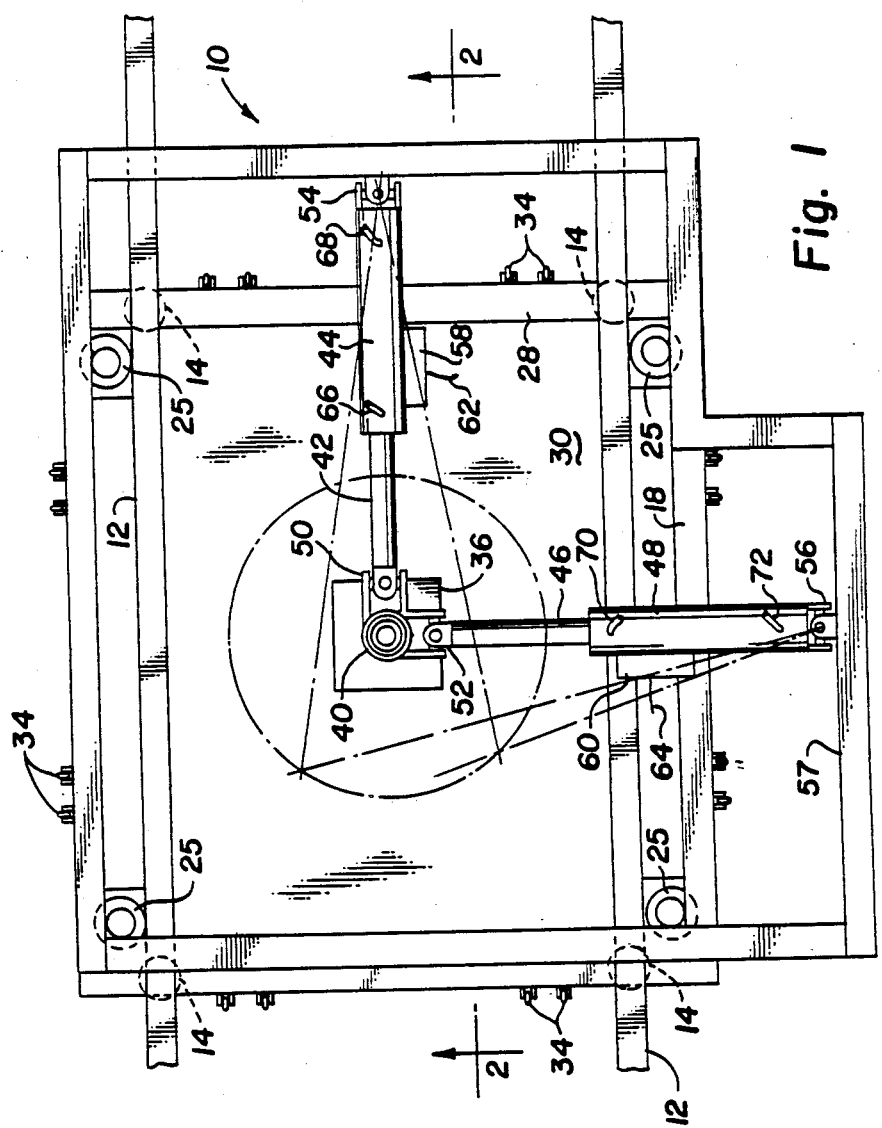
FIG. 1 is a plan view, somewhat schematic, illustrating vibratory seismic apparatus constructed in accordance with the invention.
Figure 2:
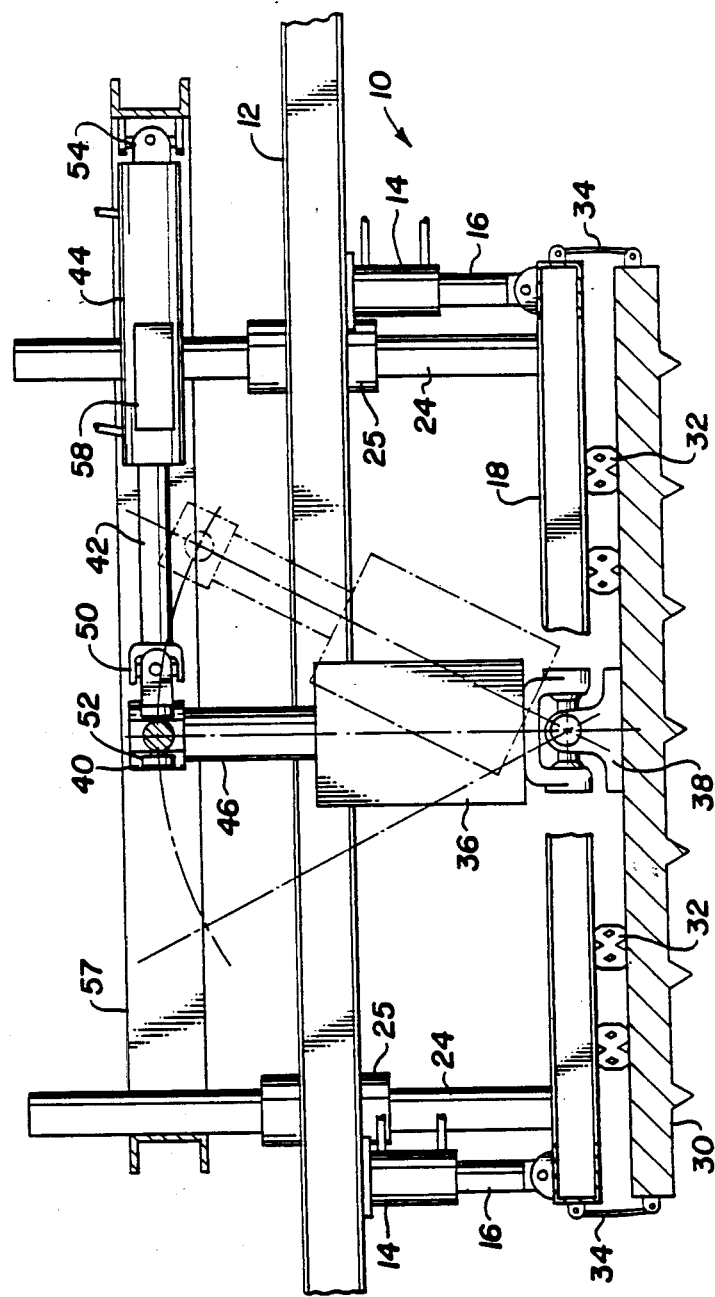
FIG. 2 is a view partly in elevation and partly in cross-section of the apparatus of FIG. 1 taken generally along the lines 2—2 of FIG. 1.

Referring to the drawing and to FIGS. 1 and 2 in particular, shown therein and generally designated by the reference character 10 is apparatus for producing vibratory seismic signals. As shown, the apparatus 10 is mounted on frame rails 12 of a vehicle. It is desirable that the apparatus 10 be located on a vehicle because of the large number of locations wherein it is desirable to produce vibratory signals during the course of geophysical or seismic exploration of an area.

As shown most clearly in FIG. 2, a plurality of lift cylinders 14 project downwardly from the rails 12. The cylinders 14 are preferably of the double-acting hydraulic type, and each includes a piston rod 16 that projects therefrom into connection with a lower lift frame 18. The arrangement is such that the lift frame 18 can be raised and lowered as desired by actuation of the lift cylinders 14.

In the preferred form of the invention, there will be provided a plurality of guide members 24 connected to the lower frame 18 and extending through sleeves 25 mounted on the vehicle frame 12. The sleeves 25 are rigidly mounted to aid in preventing lateral movement of the lift frame 18 relative to the vehicle frame 12 and thus protect the lift cylinders 14. This protection is particularly desirable when using the apparatus on slopes, etc.

The lift frame 18 is generally rectangular in configuration and is connected to a ground engaging base plate 30 by shock isolating means 32 including a plurality of spaced shock absorbing isolating means. The members 32 are constructed from a resilient material capable of supporting the weight of the base plate 30 so that the base plate 30 will be raised and lowered with the lift frame 18.

A plurality of tension members 34 are illustrated as being spaced around and extending between the lift frame 18 and the base plate 30. The tension members 34 are not required but are desirable so that the weight of the base plate 30 can be carried thereby in the event of a failure in tension of one or more of the shock isolating means 32 and to aid in preventing such failures.

A vibrator 36 has its lower end mounted for movement relative to the base plate 30 by means such as a double yoke or U-joint 38. The U-joint 38 is provided so that the vibrator 36 can be moved to a variety of positions throughout a range of inclinations and azimuths.

The upper end of the vibrator 36 is provided with a vibration absorbing coupling 40 for connecting the upper end of the vibrator 36 with a piston 42 of a double-acting hydraulic cylinder 44 and a piston 46 of a double-acting hydraulic cylinder 48. The vibration absorbing coupling 40 may be of any suitable type that will isolate the cylinders 44 and 48 from the vibrations created during operation of the vibrator 36. The pistons 42 and 46 are each connected with the coupling 40 through yokes or U-joints 50 and 52 to provide freedom of movement between the pistons 42 and 46 and the vibrator 36 during the positioning of the vibrator 36.

The cylinders 44 and 48 are connected by universal joints 54 and 56 with an upper lift frame 57. The upper lift frame 57 is connected to the upper ends of the guide members 24 above the frame 12.

A sensor 58 is mounted on the cylinder 44 and a sensor 60 is mounted on the cylinder 48. The location and arrangement of the sensors 58 and 60 are for illustration only since the exact location will depend upon the type of sensors utilized. However, the sensors 58 and 60 are of a type that will sense the positions of the pistons 42 and 46 relative to the cylinders 44 and 48 and transmit a signal relative to such positions through the conductors 62 and 64.

For the purposes of extending and retracting the piston 42, the cylinder 44 is provided with conduits 66 and 68. Similarly, to control the position of the piston 46, the cylinder 48 is provided with conduits 70 and 72. The inclination of the vibrator 36 is preferably controllable through an angle of about 25 degrees either side of the vertical, that is, relative to a line perpendicular to the upper surface of the base plate 30. Such angular movement is shown in FIG. 2. In FIG. 1, the circle shown as a dash-dot line indicates that azimuths through 360° can be attained by the vibrator 36.

Figure 3:
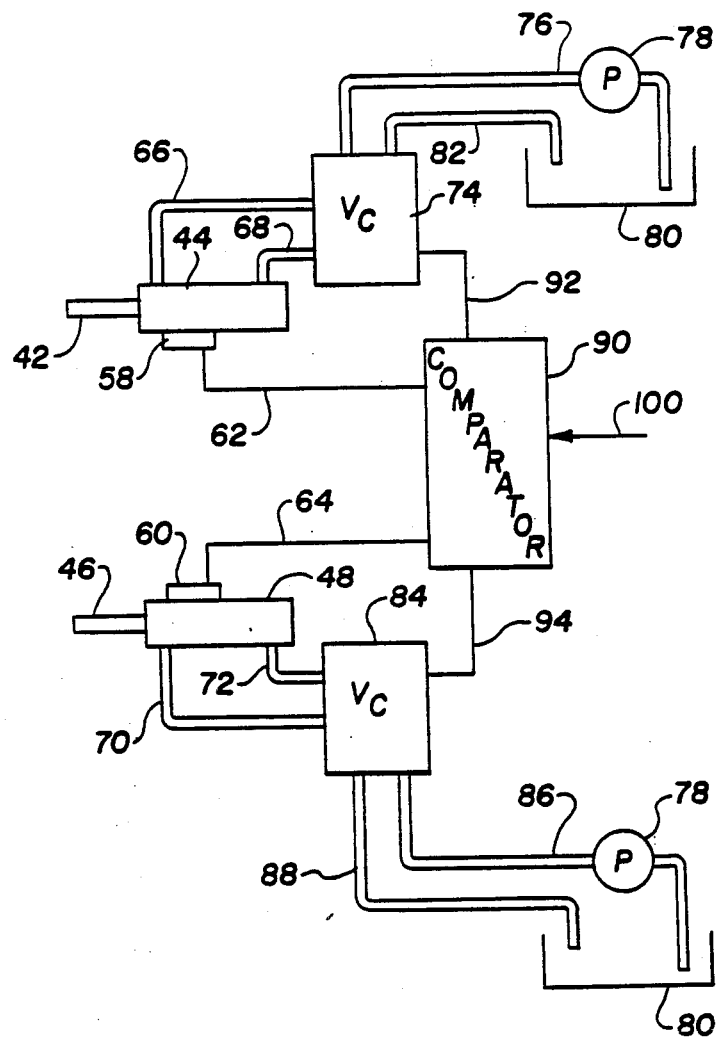
FIG. 3 is schematic diagram illustrating a typical circuit used for controlling the inclination and azimuth of vibratory apparatus that is constructed in accordance with the invention.

FIG. 3 illustrates schematically, control means that can be utilized for the purpose of positioning the vibrator 36. As illustrated therein, the conduits 66 and 68 are connected to a control valve 74 which is connected by a conduit 76 with a pump 78. The pump 78 is in turn arranged to withdraw hydraulic fluid from a reservoir 80. A return conduit 82 also extends from the control valve 74 into the reservoir 80.

In similar fashion, the hydraulic cylinder 48 is connected by the conduits 70 and 72 with a control valve 84 which is connected by a conduit 86 with the hydraulic pump 78. Return conduit 88 extends from the control valve 84 to the reservoir 80. The control valves 74 and 84 are of a well-known type and are arranged, upon receiving an appropriate signal, to shift to a position wherein one of the conduits connected to the cylinders 44 and 48 will become a supply conduit and the other will become a return conduit, so that the pistons are caused to either move into or extend from their respective cylinders.

To provide a signal for operating the control valves 74 and 84, a signal generator 90, such as a comparator or similar electronic device, is provided. The comparator 90 is connected by a conductor 92 with the control valve 74 and by a conductor 94 with the control valve 84. It will also be noted that the conductors 62 and 64 extending from the sensors 58 and 60 are connected to the comparator 90.

OPERATION OF THE PREFERRED EMBODIMENT

If the apparatus 10 is to be mounted on a vehicle, the vehicle (not shown) will be positioned so that the axial centerline of the vibrator 36 is positioned over the precise point where it is desired to impart the vibratory seismic signals into the earth. Appropriate controls (not shown) are actuated to extend the pistons 16 from the lift cylinders 14 until the base plate 30 engages the ground. When this occurs, further movement of the pistons 16 is arrested but the cylinders 14 lift the frame 12 upwardly until all or a portion of the weight of the vehicle is resting on the base plate 30.

The vibrator 36 is then positioned in accordance with the desired angle of imposition of the vibratory signal through the base plate 30. Stated another way, a signal 100 (See FIG. 3) is fed into the comparator 90 either manually or electronically. Upon receiving this signal, the comparator 90 transmits a signal through the conductors 92 and 94 to the control valves 74 and 84. The control valves are then positioned in accordance with the signal received. When the control valves move to the proper position, hydraulic fluid is introduced into the cylinders 44 and 48 through the appropriate conduits. The fluid moves the pistons 42 and 46 to position the vibrator 36 at the desired angle of inclination relative to the base plate 30 and at the desired azimuth.

During the movement of the pistons 42 and 46, signals are being generated in sensors 58 and 60. These signals are transmitted to the comparator 90 through the conductors 62 and 64. When the signals generated by the sensors 58 and 60 are combined in the comparator 90 and compared with the input signal 100, which is in accordance with the desired position of the vibrator 36, a signal is generated by the comparator 90. In response to such signal, movement of the vibrator 36 continues until the compared signals are equal. When this occurs, movement is arrested and the vibrator 36 is in a desired position for transmitting the vibratory impulses into the earth.

Although no controls or apparatus are shown for causing the vibrator 36 to oscillate, it will be understood that it is well-known in the art how such vibration is to be accomplished. An informative book on seismic vibrators is entitled *Reflection Seismology - A Tool for Energy Resource Exploration*. The author is Kenneth H. Waters and it was published by Wiley & Sons. The 3rd Edition was published in 1987.

Vibrations induced by the vibrator 36 are of a very large force and, consequently, it is highly desirable to isolate the vibrator 36 from all the apparatus with the exception of the base plate 30. Accordingly, the shock isolation means 32 located between the base plate 30 and the lift frame 18 isolate the lifting means, which includes the lift frame and the cylinders 14, and, consequently, the vehicle frame 12 from the vibrations of the base plate 30. At the upper end of the vibrator 36 there is provided the vibration isolating coupling 40 which prevents the transmission of the vibrations through the cylinders 44 and 48 into the vehicle frame 12.

It can be seen that even though vibrations induced by the vibrator 36 involve very large forces, such vibrations will be effectively isolated from the vehicle. Also, such vibrations will be isolated from the control system and, thus, the control system can be more efficient and accurate in its control and positioning of the vibrator 36.

Location of the cylinders 44 and 48 as illustrated to control the position of the vibrator 36 permits the use of the sensors 58 and 60 in a program wherein it is possible to easily and accurately vary the length of the controls by retracting or extending the pistons to locate the position of the vibrator 36 at the desired inclination and azimuth.

While the cylinders 44 and 48 are shown in a preferred relationship of about 90° apart when the axial centerline of the vibrator 36 is perpendicular to the upper surface of the base plate 30, it will be understood that they may be located at other angles relative to each other. Such other arrangements will require appropriate changes to the control program.

Having described but a single embodiment of the invention, it will be understood that many changes and modifications can be made thereto without departing from the spirit or scope of the invention.

What is claimed is:

1. Vibrator apparatus for imparting seismic vibratory signals to the earth along a selected vector path, said apparatus being arranged for mounting on a vehicle frame and comprising:

a ground-engaging base plate;

lift means for connection with said frame and connected to said base plate whereby said base plate can be moved from a transport position out of engagement with the ground to an operating position engaging the ground;

vibratory means for producing said vibratory signals having a first end, a second end, and an axial centerline, said first end being moveably mounted on said base plate; and control means connecting said second end with said lift means for positioning said vibratory means at desired inclinations and at desired azimuths, said control means including first and second variable length means disposed at substantially right angles to the axial centerline of said vibratory means when the axial centerline of said vibratory means is at a generally right angle to said base plate, means for selectively and independently changing the length of each variable length means, and signal generating means for transmitting a signal to cause said variable length means to change length to position said vibratory means at a selected inclination and azimuth.

2. The apparatus of claim 1 wherein said control means also includes comparator means operably connected with said variable length means for receiving a first signal indicative of a desired inclination and azimuth and comparing the length of said variable length means to the required length thereof when said vibratory means is at said selected inclination and azimuth and generating signals in response to differences therebetween to cause said vibratory means to move to said selected inclination and azimuth.

3. The apparatus of claim 1 wherein said variable length means includes:
   a first hydraulically-actuated, double-acting cylinder; and
   a second hydraulically-actuated, double-acting cylinder located generally in the same horizontal plane as said first cylinder and at a right angle relative thereto when said vibratory means is in a position substantially perpendicular to said base plate.

4. The apparatus of claim 2 wherein said variable length means includes:
   a first hydraulically-actuated, double-acting cylinder; and
   a second hydraulically-actuated, double-acting cylinder located generally in the same horizontal plane as said first cylinder and at a right angle relative thereto when said vibratory means is in a position substantially perpendicular to said base plate.

5. The apparatus of claim 1 and also including vibration damping means interposed between said vibratory means and said control means.

6. The apparatus of claim 2 and also including vibration damping means interposed between said vibratory means and said control means.

7. The apparatus of claim 3 and also including vibration damping means interposed between said first and second hydraulic cylinders and said vibration means.

8. The apparatus of claim 4 and also including vibration damping means interposed between said first and second hydraulic cylinders and said vibration means.

9. The apparatus of claim 1 wherein said lift means includes:
   a lift frame located generally parallel and in spaced relation to said base plate;
   a plurality of spaced, resilient, shock absorbing members connecting said lift frame and base plate; and
   cylinder means for connection with the vehicle frame and lift frame for raising and lowering said lift frame and base plate 10. The apparatus of claim 9 wherein said lift means also includes a plurality of spaced tension members connecting said lift frame and base plate.

11. The apparatus of claim 9 wherein said lift means also includes relatively rigid guide members for extending between the vehicle frame and said lift frame for resisting lateral movement between the vehicle frame and said lift frame.

* * * * *